US011279791B2

(12) United States Patent
Ryu

(10) Patent No.: US 11,279,791 B2
(45) Date of Patent: Mar. 22, 2022

(54) POLYMERIZABLE COMPOSITION FOR OPTICAL MATERIAL, METHOD FOR MANUFACTURING POLYMERIZABLE COMPOSITION FOR OPTICAL MATERIAL, AND METHOD FOR MANUFACTURING OPTICAL ARTICLE

(71) Applicant: MITSUI CHEMICALS, INC., Tokyo (JP)

(72) Inventor: Akinori Ryu, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/977,110

(22) PCT Filed: Mar. 15, 2019

(86) PCT No.: PCT/JP2019/010785
§ 371 (c)(1),
(2) Date: Sep. 1, 2020

(87) PCT Pub. No.: WO2019/177141
PCT Pub. Date: Sep. 19, 2019

(65) Prior Publication Data
US 2021/0009746 A1 Jan. 14, 2021

(30) Foreign Application Priority Data
Mar. 16, 2018 (JP) .............................. JP2018-048936

(51) Int. Cl.
| C08G 18/10 | (2006.01) |
| C08G 18/32 | (2006.01) |
| C08G 18/38 | (2006.01) |
| C08G 18/50 | (2006.01) |
| G02B 1/04 | (2006.01) |

(52) U.S. Cl.
CPC ............ *C08G 18/10* (2013.01); *C08G 18/32* (2013.01); *C08G 18/3819* (2013.01); *C08G 18/5021* (2013.01); *G02B 1/041* (2013.01)

(58) Field of Classification Search
CPC .... C08G 18/10; C08G 18/32; C08G 18/3819; C08G 18/5021; C08G 18/324; C08G 18/5024; C08G 18/722; C08G 18/757; C08G 18/3206; C08G 18/3876; C08G 18/4277; C08G 18/44; C08G 18/6674; C08G 18/73; C08G 18/8038; C08G 18/242; C08G 18/3225; G02B 1/041; G02B 1/04; B29D 11/00
See application file for complete search history.

(56) References Cited

U.S. PATENT DOCUMENTS

| 4,672,100 | A | 6/1987 | Schoenbaechler et al. |
| 6,008,296 | A * | 12/1999 | Yang .................... C08G 75/045 |
| | | | 252/182.17 |
| 7,009,032 | B2 | 3/2006 | Bojkova et al. |
| 7,087,698 | B1 | 8/2006 | Okoroafor et al. |
| 7,098,290 | B1 | 8/2006 | Okoroafor et al. |
| 7,696,296 | B2 | 4/2010 | Bojkova et al. |
| 9,568,643 | B2 | 2/2017 | Bojkova et al. |
| 9,891,349 | B2 | 2/2018 | Bojkova et al. |
| 10,012,773 | B2 | 7/2018 | Bojkova et al. |
| 10,308,756 | B2 | 6/2019 | Kawato |
| 10,344,116 | B2 | 7/2019 | Kawato |
| 10,563,003 | B2 | 2/2020 | Ryu |
| 2004/0143090 | A1 | 7/2004 | Bojkova et al. |
| 2006/0155093 | A1 | 7/2006 | Kitahara |
| 2007/0270548 | A1 | 11/2007 | Bojkova et al. |
| 2010/0234552 | A1 | 9/2010 | Kitahara |
| 2014/0171612 | A1 | 6/2014 | Bojkova et al. |
| 2017/0129989 | A1 | 5/2017 | Kawato |
| 2017/0153359 | A1 | 6/2017 | Bojkova et al. |
| 2017/0204217 | A1 | 7/2017 | Kawato |
| 2017/0235022 | A1 | 8/2017 | Bojkova et al. |
| 2019/0127508 | A1 | 5/2019 | Ryu |
| 2020/0140598 | A1 | 5/2020 | Ryu |

FOREIGN PATENT DOCUMENTS

| JP | S60184514 A | | 9/1985 |
| JP | H0693073 A | | 4/1994 |
| JP | H10306210 A | | 11/1998 |
| JP | 2003514934 A | | 4/2003 |
| JP | 2005509703 A | | 4/2005 |
| JP | 2009520057 A | | 5/2009 |
| JP | 2009536255 A | | 10/2009 |
| JP | 2016507626 A | | 3/2016 |
| JP | 2017502119 A | | 1/2017 |
| WO | 2004108786 A1 | | 12/2004 |
| WO | WO 2007/078549 | * | 12/2007 |
| WO | 2014126552 A1 | | 8/2014 |
| WO | 2016006605 A1 | | 1/2016 |
| WO | 2016006606 A1 | | 1/2016 |
| WO | 2018079518 A1 | | 5/2018 |

* cited by examiner

OTHER PUBLICATIONS

International Search Report (with English Translation) and Written Opinion issued in corresponding International Patent Application No. PCT/JP2019/010785, 10 pages (dated Apr. 23, 2019).

*Primary Examiner* — Michael B Nelson
(74) *Attorney, Agent, or Firm* — Buchanan, Ingersoll & Rooney PC

(57) ABSTRACT

A polymerizable composition for an optical material includes a prepolymer which is a reaction product of a first amine compound (A1) having a weight-average molecular weight of less than 4,000, a first diol compound (B1) having a viscosity (25° C.) of equal to or less than 100 mPa·s, and a polyisocyanate compound (C); and a first polythiol compound (D1), in which the first amine compound (A1) is at least one selected from a polyetheramine and an aromatic amine, and the first polythiol compound (D1) includes a dithiol compound (d1) having two mercapto groups and a polythiol compound (d2) having equal to or more than three mercapto groups.

23 Claims, No Drawings

POLYMERIZABLE COMPOSITION FOR OPTICAL MATERIAL, METHOD FOR MANUFACTURING POLYMERIZABLE COMPOSITION FOR OPTICAL MATERIAL, AND METHOD FOR MANUFACTURING OPTICAL ARTICLE

TECHNICAL FIELD

The present invention relates to a polymerizable composition for an optical material, a method for manufacturing a polymerizable composition for an optical material, and a method for manufacturing an optical article.

BACKGROUND ART

In comparison with inorganic lenses, plastic lenses are lighter, harder to break and able to be dyed and have thus rapidly become widespread in optical materials such as spectacle lenses and camera lenses in recent years.

Although glass has been the main material used as an optical material since ancient times, in recent years, various plastics for optical materials have been developed and the use thereof as an alternative to glass is expanding. Even for optical materials such as spectacle lenses, plastic materials such as acrylic resins, aliphatic carbonate resins, polycarbonates, and polyurethanes are mainly used because these materials have excellent optical characteristics, are lightweight, do not break, and have excellent moldability.

In particular, polyurethane-containing materials have been developed as useful polymers for manufacturing optical materials due to good optical characteristics such as refractive index and mechanical characteristics such as impact resistance (for example, Patent Document 1 and Patent Document 2).

Patent Document 1 proposes a method for manufacturing a polyurethane urea-containing composition by reacting a polyisocyanate, a polyol which does not include an amino group, a polyol and/or a polythiol, and an amino alcohol. In Patent Document 1, the use of amino alcohol moderates the reaction of isocyanate and imparts desired physical characteristics to the obtained final product.

Patent Document 2 proposes an economically efficient method for manufacturing an impact-resistant polyurethane polymer by reacting a specific primary amine-terminated polyether, an aliphatic polyisocyanate, a polyol, and an aromatic diamine in a one-step process.

RELATED DOCUMENT

Patent Document

[Patent Document 1] PCT Japanese Translation Patent Publication No. 2017-502119
[Patent Document 2] PCT Japanese Translation Patent Publication No. 2016-507626

SUMMARY OF THE INVENTION

Technical Problem

In a case where an amine such as polyetheramine is used to manufacture a thiourethane urea resin with excellent mechanical characteristics such as impact resistance, if the material is reacted in a one-step process, reactivity with isocyanate is high, a uniform prepolymer solution is not obtained, and a prepolymer is precipitated and, as a result, it may not be possible to obtain a transparent thiourethane urea resin.

The present inventors found that adjusting the manufacturing method makes it possible to prevent precipitation of a prepolymer and to obtain a thiourethane urea resin which is transparent and excellent in impact resistance, thereby completing the present invention.

Solution to Problem

That is, it is possible to illustrate the present invention as follows.

[1] A polymerizable composition for an optical material including a prepolymer which is a reaction product of a first amine compound (A1) having a weight-average molecular weight of less than 4,000, a first diol compound (B1) having a viscosity (25° C.) of equal to or less than 100 mPa·s, and a polyisocyanate compound (C); a first polythiol compound (D1); and a catalyst, in which the first amine compound (A1) is at least one selected from a polyetheramine and an aromatic amine, and the first polythiol compound (D1) includes a dithiol compound (d1) having two mercapto groups and a polythiol compound (d2) having equal to or more than three mercapto groups.

[2] The polymerizable composition for an optical material according to [1], in which the polyetheramine includes at least one selected from the group consisting of a polyetheramine represented by Formula (1) and a polyetheramine represented by Formula (2):

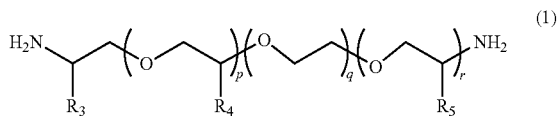

wherein in Formula (1), $R_3$ to $R_5$ each represent a hydrogen atom or a methyl group, p represents an integer of 0 to 49, q represents an integer of 0 to 65, r represents an integer of 1 to 50, p+r satisfies an integer of 1 to 99, a plurality of $R_4$s or $R_5$s may be the same as or different from each other;

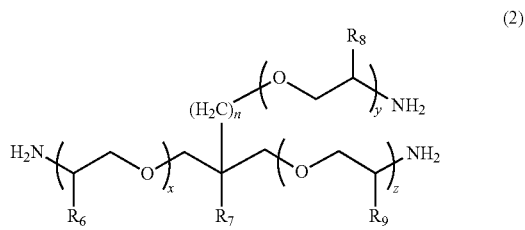

wherein in Formula (2), $R_6$, $R_8$, and $R_9$ each represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 50, n represents an integer of 0 to 10, and a plurality of $R_6$s, $R_8$s, or $R_9$s may be the same as or different from each other.

[3] The polymerizable composition for an optical material according to [2], in which the polyetheramine has a weight-average molecular weight of more than 230.

[4] The polymerizable composition for an optical material according to [1], in which the aromatic amine is at least one selected from the group consisting of 3,5-diethyltoluene-2,4-diamine and 3,5-diethyltoluene-2,6-diamine.

[5] The polymerizable composition for an optical material according to any one of [1] to [4], further including a second diol compound (B2).

[6] The polymerizable composition for an optical material according to any one of [1] to [4], further including a second amine compound (A2) having a weight-average molecular weight of equal to or more than 400 and less than 4,000.

[7] The polymerizable composition for an optical material according to any one of [1] to [4], further including the second amine compound (A2) having a weight-average molecular weight of equal to or more than 400 and less than 4,000 and the second diol compound (B2).

[8] The polymerizable composition for an optical material according to any one of [1] to [7], in which the first diol compound (B1) includes a linear aliphatic diol.

[9] The polymerizable composition for an optical material according to any one of [1] to [8], in which the first diol compound (B1) has a viscosity (25° C.) of equal to or more than 1 mPa·s and equal to or less than 100 mPa·s.

[10] The polymerizable composition for an optical material according to [5] or [7], in which the second diol compound (B2) has a viscosity (25° C.) of equal to or more than 100 mPa·s.

[11] The polymerizable composition for an optical material according to any one of [1] to [10], in which the catalyst includes at least one selected from dimethyltin chloride, dibutyltin chloride, and dibutyltin dilaurate.

[12] A method for manufacturing a polymerizable composition for an optical material, the method including a first step of mixing a first amine compound (A1) having a weight-average molecular weight of less than 4,000 with a first diol compound (B1) having a viscosity (25° C.) of equal to or less than 100 mPa·s to obtain a first mixture, the first amine compound (A1) being at least one selected from a polyetheramine and an aromatic amine; a second step of obtaining a prepolymer by mixing the first mixture and a polyisocyanate compound (C); and a third step of mixing the prepolymer and a catalyst, then adding a first polythiol compound (D1) including a dithiol compound (d1) having two mercapto groups and a polythiol compound (d2) having equal to or more than three mercapto groups thereto, and carrying out mixing.

[13] The method for manufacturing a polymerizable composition for an optical material according to [12], in which the polyetheramine includes at least one kind selected from the group consisting of a polyetheramine represented by Formula (1) and a polyetheramine represented by Formula (2):

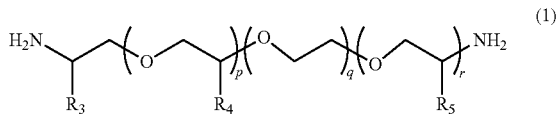

wherein in Formula (1), $R_3$ to $R_5$ each represent a hydrogen atom or a methyl group, p represents an integer of 0 to 49, q represents an integer of 0 to 65, r represents an integer of 1 to 50, p+r satisfies an integer of 1 to 99, and a plurality of $R_4$s or $R_5$s may be the same as or different from each other;

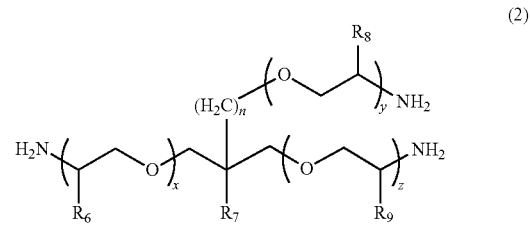

wherein in Formula (2), $R_6$, $R_8$, and $R_9$ each represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 50, n represents an integer of 0 to 10, and a plurality of $R_6$s, $R_8$s, or $R_9$s may be the same as or different from each other.

[14] The method for manufacturing a polymerizable composition for an optical material according to [13], in which the polyetheramine has a weight-average molecular weight of more than 230.

[15] The method for manufacturing a polymerizable composition for an optical material according to [12], in which the aromatic amine is at least one selected from the group consisting of 3,5-diethyltoluene-2,4-diamine and 3,5-diethyltoluene-2,6-diamine.

[16] The method for manufacturing a polymerizable composition for an optical material according to any one of [12] to [15], in which the third step includes a step of mixing the prepolymer and the catalyst, then adding the first polythiol compound (D1) thereto and carrying out mixing, then adding the second diol compound (B2) thereto and carrying out mixing.

[17] The method for manufacturing a polymerizable composition for an optical material according to any one of [12] to [15], in which the third step includes a step of mixing the prepolymer and the catalyst, then adding the second amine compound (A2) having a weight-average molecular weight of equal to or more than 400 and less than 4,000 and the first polythiol compound (D1) thereto and carrying out mixing.

[18] The method for manufacturing a polymerizable composition for an optical material according to any one of [12] to [15], in which the third step includes a step of mixing the prepolymer and the catalyst, then adding the second amine compound (A2), the first polythiol compound (D1), and the second diol compound (B2) thereto and carrying out mixing.

[19] The method for manufacturing a polymerizable composition for an optical material according to any one of [12] to [18], in which the first diol compound (B1) includes a linear aliphatic diol.

[20] The method for manufacturing a polymerizable composition for an optical material according to any one of [12] to [19], in which the first diol compound (B1) has a viscosity (25° C.) of equal to or more than 1 mPa·s and less than 100 mPa·s.

[21] The method for manufacturing a polymerizable composition for an optical material according to [16] or [18], in which the second diol compound (B2) has a viscosity (25° C.) of equal to or more than 100 mPa·s.

[22] A method for manufacturing an optical article, the method including a step of polymerizing and curing the polymerizable composition for an optical material according to any one of [1] to [11] by a cast polymerization method to obtain an optical article.

[23] A method for manufacturing an optical material, the method including a step of obtaining a polymerizable composition for an optical material by the method according to any one of [12] to [21]; and a step of obtaining an optical material by polymerizing and curing the polymerizable composition for an optical material by a cast polymerization method.

Advantageous Effects of Invention

According to the present invention, it is possible to provide a polymerizable resin composition, which prevents precipitation of a prepolymer and which is used for manufacturing a thiourethane urea resin which is transparent and excellent in impact resistance, and a method for manufacturing this polymerizable composition.

DESCRIPTION OF EMBODIMENTS

A description will be given of the polymerizable composition for an optical material of the present invention and the manufacturing method thereof based on the following embodiments.

(Polymerizable Composition for Optical Material)

The polymerizable composition for an optical material of the present invention (also referred to below as "polymerizable composition") includes a prepolymer which is a reaction product of a first amine compound (A1) having a weight-average molecular weight of less than 4,000, a first diol compound (B1) having a viscosity (25° C.) of equal to or less than 100 mPa·s, and a polyisocyanate compound (C); a first polythiol compound (D1); and a catalyst, in which the first amine compound (A1) is at least one selected from a polyetheramine and an aromatic amine, and the first polythiol compound (D1) includes a dithiol compound (d1) having two mercapto groups and a polythiol compound (d2) having equal to or more than three mercapto groups.

The prepolymer used in the polymerizable composition of the present embodiment is a reaction product obtained by reacting the first amine compound (A1), the first diol compound (B1), and the polyisocyanate compound (C).

The amine compound (A1) used in the polymerizable composition of the present embodiment has a weight-average molecular weight of less than 4,000, and is at least one kind selected from polyetheramines and aromatic amines. By using such an amine compound (A1), a cured product of the obtained polymerizable composition has improved impact resistance.

In one embodiment, the polyetheramine used as the amine compound (A1) includes at least one kind selected from a polyetheramine represented by Formula (1) and a polyetheramine represented by Formula (2).

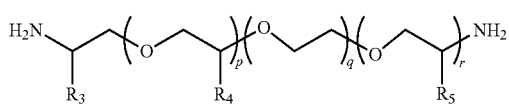

In Formula (1), $R_3$ to $R_5$ each represent a hydrogen atom or a methyl group. p represents an integer of 0 to 49, q represents an integer of 0 to 65, r represents an integer of 1 to 50, and p+r satisfies an integer of 1 to 99. A plurality of $R_4$s or $R_5$s may be the same as or different from each other.

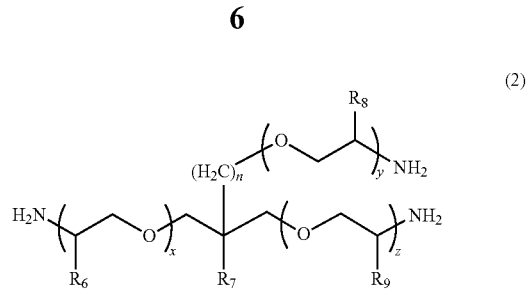

In Formula (2), $R_6$, $R_8$, and $R_9$ each represent a hydrogen atom or a methyl group. $R_7$ represents a linear alkyl group having 1 to 20 carbon atoms, a branched alkyl group having 3 to 20 carbon atoms, or a cyclic alkyl group having 3 to 20 carbon atoms. x+y+z represents an integer of 1 to 50. n represents an integer of 0 to 10. A plurality of $R_6$s, $R_8$s, or $R_9$s may be the same as or different from each other.

Here, examples of the linear alkyl group having 1 to 20 carbon atoms represented by $R_7$ include a methyl group, an ethyl group, an n-propyl group, an n-butyl group, a pentyl group, a hexyl group, a heptyl group, an n-octyl group, a nonyl group, a decyl group, a dodecyl group, and the like, examples of a branched alkyl group having 3 to 20 carbon atoms include an isopropyl group, an isobutyl group, a t-butyl group, an isopentyl group, an isooctyl group, a 2-ethylhexyl group, a 2-propylpentyl group, an isodecyl group, and the like; and examples of the cyclic alkyl group having 3 to 20 carbon atoms include a cyclopropyl group, a cyclobutyl group, a cyclopentyl group, a cyclohexyl group, a cycloheptyl group, a cyclooctyl group, and the like.

In one embodiment, a compound represented by Formula (1a) is used as polyetheramine represented by Formula (1).

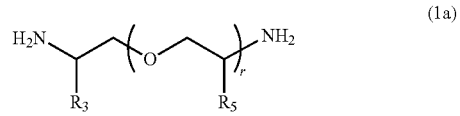

In Formula (1a), $R_3$, $R_5$, and r have the same meanings as $R_3$, $R_5$, and r in General Formula (1), respectively.

The weight-average molecular weight of the amine compound (A1) is less than 4,000, preferably equal to or less than 3,000, more preferably equal to or less than 2,000, even more preferably equal to or less than 1,000, still more preferably equal to or less than 800, and yet more preferably equal to or less than 600.

In one embodiment, the aromatic amine used as the amine compound (A1) refers to a primary amine or a secondary amine in which an amino group is directly bonded to an aromatic ring. As the aromatic amine, for example, it is possible to use 3,5-diethyltoluene-2,4-diamine or 3,5-diethyltoluene-2,6-diamine.

In a case where the polyetheramine is used as the amine compound (A1), the weight-average molecular weight of the polyetheramine is preferably more than 230, more preferably equal to or more than 250, even more preferably equal to or more than 280, and particularly preferably equal to or more than 300. By using a polyetheramine having such a weight-average molecular weight, a thiourethane urea resin obtained by curing a polymerizable composition including a prepolymer obtained from the amine compound (A1) has excellent impact resistance.

The first amine compound (A1) and the second amine compound (A2) described below may be the same as or different from each other, but are preferably different amine compounds.

The diol compound (B1) used in the polymerizable composition for an optical material according to the present embodiment has a viscosity (25° C.) of equal to or less than 100 mPa·s, and preferably has a viscosity (25° C.) of equal to or more than 1 mPa·s and equal to or less than 100 mPa·s. The diol compound (B1) preferably has a molecular weight in the range of 50 to 350. Examples of such a diol compound (B1) include sulfur atom-containing polyols such as propylene glycol, dipropylene glycol, tripropylene glycol, ethylene glycol, diethylene glycol, and triethylene glycol, without being limited thereto.

As the polyisocyanate compound (C) used in the polymerizable composition for an optical material of the present embodiment, it is possible to use an aliphatic polyisocyanate compound, an alicyclic polyisocyanate compound, an aromatic polyisocyanate compound, a heterocyclic polyisocyanate compound, or the like. More specifically, as the polyisocyanate compound (C), it is possible to use aliphatic polyisocyanate compounds such as pentamethylene diisocyanate, hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, p-xylene diisocyanate, α,α,α',α'-tetramethylxylylene diisocyanate, bis(isocyanatomethyl) naphthalene, mesitylylene triisocyanate, bis(isocyanatomethyl) sulfide, bis(isocyanatoethyl) sulfide, bis(isocyanatomethyl) disulfide, bis(isocyanatoethyl) disulfide, bis(isocyanatomethylthio) methane, bis(isocyanatoethylthio) methane, bis(isocyanatomethylthio) ethane, and bis(isocyanatomethylthio) ethane; alicyclic polyisocyanate compounds such as isophorone diisocyanate, bis(isocyanatomethyl) cyclohexane, dicyclohexylmethane-4,4'-diisocyanate, cyclohexanediisocyanate, methylcyclohexanediisocyanate, dicyclohexyldimethylmethaneisocyanate, 2,5-bis(isocyanatomethyl) bicyclo-[2.2.1]-heptane, 2,6-bis(isocyanatomethyl) bicyclo-[2.2.1]-heptane, 3,8-bis(isocyanatomethyl) tricyclodecane, 3,9-bis(isocyanatomethyl) tricyclodecane, 4,8-bis(isocyanatomethyl) tricyclodecane, and 4,9-bis(isocyanatomethyl) tricyclodecane; aromatic polyisocyanate compounds such as phenylene diisocyanate, 2,4-tolylene diisocyanate, 2,6-tolylene diisocyanate, 4,4'-diphenylmethane diisocyanate, and diphenyl sulfide-4,4-diisocyanate; heterocyclic polyisocyanate compounds such as 2,5-diisocyanatothiophene, 2,5-bis(isocyanatomethyl) thiophene, 2,5-diisocyanatotetrahydrothiophene, 2,5-bis(isocyanatomethyl) tetrahydrothiophene, 3,4-bis(isocyanatomethyl) tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane.

In particular, it is possible to preferably use at least one kind selected from hexamethylene diisocyanate, pentamethylene diisocyanate, m-xylylene diisocyanate, isophorone diisocyanate, bis(isocyanatomethyl) cyclohexane, dicyclohexylmethane-4,4'-diisocyanate, 2,5-bis(isocyanatomethyl) bicyclo-[2.2.1]-heptane, 2,6-bis(isocyanatomethyl) bicyclo-[2.2.1]-heptane, tolylene diisocyanate, phenylene diisocyanate, and 4,4'-diphenylmethane diisocyanate.

More preferably, it is possible to use at least one kind selected from m-xylylene diisocyanate, bis(isocyanatomethyl) cyclohexane, dicyclohexylmethane-4,4'-diisocyanate, 2,5-bis(isocyanatomethyl) bicyclo-[2.2.1]-heptane, and 2,6-bis(isocyanatomethyl) bicyclo-[2.2.1]-heptane.

The polythiol compound (D1) used in the polymerizable composition for an optical material of the present embodiment includes a dithiol compound (d1) having two mercapto groups and a polythiol compound (d2) having equal to or more than three mercapto groups.

Examples of the dithiol compound (d1) include aliphatic polythiol compounds such as methanedithiol, 1,2-ethanedithiol, 1,2-cyclohexanedithiol, bis(2-mercaptoethyl) ether, diethylene glycol bis(2-mercaptoacetate), diethylene glycol bis(3-mercaptopropionate), ethylene glycol bis(2-mercaptoacetate), ethylene glycol bis(3-mercaptopropionate), bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio) methane, bis(2-mercaptoethylthio) methane, bis(3-mercaptopropylthio) methane, 1,2-bis(mercaptomethylthio) ethane, 1,2-bis(2-mercaptoethylthio) ethane, 1,2-bis(3-mercaptopropylthio) ethane, 2,5-dimercaptomethyl-1,4-dithiane, 2,5-dimercapto-1,4-dithiane, 2,5-dimercaptomethyl-2,5-dimethyl-1,4-dithiane, and thioglycolic acid and mercaptopropionic acid esters thereof; bis(2-mercaptoethyl) sulfide, hydroxymethylsulfidebis(2-mercaptoacetate), hydroxymethylsulfidebis(3-mercaptopropionate), hydroxyethylsulfidebis(2-mercaptoacetate), hydroxyethylsulfidebis(3-mercaptopropionate), hydroxymethyldisulfidebis(2-mercaptoacetate), hydroxymethyldisulfidebis(3-mercaptopropionate), hydroxyethyldisulfidebis(2-mercaptoacetate), hydroxyethyldisulfidebis(3-mercaptopropinate), 2-mercaptoethyl ether bis(2-mercaptoacetate), 2-mercaptoethyl ether bis(3-mercaptopropionate), bis(2-mercaptoethyl ester) thiodiglycolate, bis(2-mercaptoethyl ester) thiodipropionate, bis(2-mercaptoethyl ester) dithiodiglycolate, bis(2-mercaptoethyl ester) dithiodipropionate, and 4,6-bis(mercaptomethylthio)-1,3-dithiane; aromatic polythiol compounds such as 1,2-dimercaptobenzene, 1,3-dimercaptobenzene, 1,4-dimercaptobenzene, 1,2-bis(mercaptomethyl) benzene, 1,3-bis(mercaptomethyl) benzene, 1,4-bis(mercaptomethyl) benzene, 1,2-bis(mercaptoethyl) benzene, 1,3-bis(mercaptoethyl) benzene, 1,4-bis(mercaptoethyl) benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio) ethyl)-1,3-dithiethane; and the like.

As the dithiol compound (d1), from the viewpoint of the optical characteristics of the thiourethane urea resin obtained by curing the polymerizable composition containing the same, it is preferable to use at least one kind of compound selected from the group consisting of 2,5-dimercaptomethyl-1,4-dithiane, ethylene glycol bis(3-mercaptopropionate), 4,6-bis(mercaptomethylthio)-1,3-dithiane, 2-(2,2-bis(mercaptomethylthio) ethyl)-1,3-dithiethane, and bis(2-mercaptoethyl) sulfide.

In particular, it is particularly preferable to use at least one kind of compound selected from the group consisting of 2,5-dimercaptomethyl-1,4-dithiane, ethylene glycol bis(3-mercaptopropionate), 4,6-bis(mercaptomethylthio)-1,3-dithiane, and bis(2-mercaptoethyl) sulfide.

Examples of the polythiol compound (d2) having equal to or more than three mercapto groups include 1,2,3-propanetrithiol, tetrakis(mercaptomethyl) methane, trimethylolpropanetris(2-mercaptoacetate), trimethylolpropanetris(3-mercaptopropionate), trimethylolethanetris(2-mercaptoacetate), trimethylolethanetris(3-mercaptopropionate), pentaerythritol tetrakis(2-mercaptoacetate), pentaerythritol tetrakis(3-mercaptopropionate), 1,2,3-tris(mercaptomethylthio) propane, 1,2,3-tris(2-mercaptoethylthio) propane, 1,2,3-tris(3-mercaptopropylthio) propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl) methane, tetrakis(2-mercaptoethylthiomethyl) methane, tetrakis(3-mercaptopropylthiomethyl) methane, bis(2,3-dimercaptopropyl) sulfide, and thioglycolic acid and mercaptopropionic acid esters thereof; aliphatic polythiol compounds such as 1,1,3,3-tetrakis(mercaptomethylthio) propane, 1,1,2,2-tetrakis(mercaptomethylthio) ethane, tris(mercaptomethylthio) methane, and tris(mercaptoethylthio) methane; aromatic polythiol compounds such as 1,3,5-trimercaptobenzene, 1,3,5-tris(mercaptomethyl) benzene, 1,3,5-tris(mercaptomethyleneoxy) benzene, and 1,3,5-tris(mercaptoethyleneoxy) benzene; heterocyclic polythiol compounds such as 2,4,6-trimercapto-s-triazine, and 2,4,6-trimercapto-1,3,5-triazine; and the like.

As the polythiol compound (d2), from the viewpoint of the optical characteristics of a thiourethane urea resin obtained by curing a polymerizable composition including the same, it is preferable to use at least one kind of compound selected from the group consisting of trimethylolpropanetris(3-mercaptopropionate), pentaerythritol tetrakis(2-mercaptoacetate), pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, and 1,1,3,3-tetrakis(mercaptomethylthio) propane.

In particular, it is preferable to use at least one kind of compound selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

In one embodiment, the polymerizable resin composition includes a second diol (B2) in addition to the prepolymer and the first polythiol compound (D1).

The second diol compound (B2) may be the same as or different from the first diol (B1) described above. Preferably, the second diol compound has a viscosity (25° C.) of equal to or more than 100 mPa·s, and more preferably a viscosity (25° C.) of more than 100 mPa·s and equal to or less than 30,000 mPa·s. The second diol compound (B2) preferably has a molecular weight in the range of 100 to 3,000. Examples of the diol compound (B2) include polyethylene glycol, cyclobutanediol, cyclopentanediol, cyclohexanediol, cycloheptanediol, cyclooctanediol, hydroxypropylcyclohexanol, tricyclo[5.2.1.0(2,6)]decane-dimethanol, bicyclo[4.3.0]-nonanediol, dicyclohexanediol, tricyclo[5.3.1.1]dodecanediol, bicyclo[4.3.0]nonanedimethanol, tricyclo[5.3.1.1]dodecanediethanol, hydroxypropyltricyclo[5.3.1.1]dodecanol, spiro[3.4]octanediol, butylcyclohexanediol, 1,1'-bicyclohexylidenediol, dihydroxybenzene, bisphenol F, tetrabromobisphenol tetrabromobisphenol A-bis-(2-hydroxyethyl ether), polypropylene glycol, 1,4-cyclohexanedimethanol, tricyclodecanedimethanol, alcohol ethoxylate, polycaprolactonediol, ethoxylated bisphenol A; bis-[4-(hydroxyethoxy) phenyl]sulfide, bis-[4-(2-hydroxypropoxy) phenyl]sulfide, bis-[4-(2,3-dihydroxypropoxy) phenyl]sulfide, bis-[4-(4-hydroxycyclohexyloxy) phenyl]sulfide, bis-[2-methyl-4-(hydroxyethoxy)-6-butylphenyl]sulfide, compounds in which on average equal to or less than 3 molecules of ethylene oxide and/or propylene oxide per hydroxyl group are added to the above compounds; di-(2-hydroxyethyl) sulfide, 1,2-bis-(2-hydroxyethylmercapto) ethane, bis (2-hydroxyethyl) disulfide, 1,4-dithiane-2,5-diol, bis(2 3-dihydroxypropyl) sulfide, tetrakis(4-hydroxy-2-thiabutyl) methane, bis(4-hydroxyphenyl) sulfone (bisphenol S), tetrabromobisphenol S, tetramethylbisphenol S, 4,4'-thiobis(6-tert-butyl-3-methylphenol), 1,3-bis(2-hydroxyethylthioethyl)-cyclohexane, and the like, without being limited thereto.

By using the second diol (B2) described above, a thiourethane urea resin obtained by curing a polymerizable composition including the same has a low haze and excellent heat resistance.

In one embodiment, the polymerizable resin composition includes a second amine compound (A2) in addition to the prepolymer and the first polythiol compound (D1). Here, the second amine compound (A2) preferably has a weight-average molecular weight of equal to or more than 400 and less than 4,000. The second amine compound (A2) may be the same as or different from the first amine compound (A1), but is preferably a different amine compound, and preferably has a weight-average molecular weight of equal to or more than 400 and less than 4,000, and more preferably equal to or more than 600 and equal to or less than 2,000. As such an amine compound (A2), a polyetheramine compound is preferable, and specifically, examples thereof include (propylene glycol) bis(2-aminopropyl ether), (ethylene glycol) bis(2-aminopropyl ether), (propylene glycol) tris(2-aminopropyl ether), (ethylene glycol) tris(2-aminopropyl ether), and the like, and examples of commercially available products thereof include Jeffamine D series, Jeffamine ED series, and Jeffamine T series (manufactured by Huntsman), without being limited thereto. Using the second amine compound (A2) makes it possible to adjust the viscosity (25° C.) and pot life of the obtained polymerizable composition. In addition, using the second amine compound (A2) makes it possible to adjust various physical properties such as optical properties, impact resistance, and specific gravity of the thiourethane urea resin obtained by curing the polymerizable composition including the same according to the intended use.

In one embodiment, the polymerizable resin composition includes a second amine compound (A2) and a second diol compound (B2) in addition to the prepolymer and the first polythiol compound (D1). Using the second amine compound (A2) and the second diol compound (B2) makes it possible to adjust the viscosity (25° C.) and the pot life of the obtained polymerizable composition. In addition, using the above makes it possible to adjust various characteristics such as the optical properties, impact resistance, and specific gravity of the thiourethane urea resin obtained by curing the polymerizable composition according to the intended use.

The polymerizable composition of the present embodiment preferably includes a polymerization catalyst in addition to the above components. Examples of the polymerization catalyst used include dimethyltin chloride, dibutyltin chloride, and dibutyltin dilaurate, without being limited thereto. The blending amount of the catalyst is preferably 0.005 parts by weight to 0.5 parts by weight with respect to 100 parts by weight of the polymerizable composition, and more preferably 0.005 parts by weight to 0.3 parts by weight.

The polymerizable composition for an optical material of the present embodiment may include additives such as an internal mold release agent, a resin modifier, a light stabilizer, a bluing agent, an ultraviolet absorber, an antioxidant, an anti-coloring agent, a dye, and a photochromic dye depending on the characteristics desired in the application to which the composition is applied.

(Method for Manufacturing Polymerizable Composition)

A description will be given of the method for manufacturing a polymerizable composition for an optical material of the present invention based on the following embodiments.

The method for manufacturing a polymerizable composition for an optical material of the present invention includes a first step of mixing the first amine compound (A1) having a weight-average molecular weight of less than 4,000 and the first diol compound (B1) having a viscosity (25° C.) of equal to or less than 100 mPa·s to obtain a first mixture, a second step of obtaining a prepolymer by mixing the first mixture and the polyisocyanate compound (C), and a third step of mixing the prepolymer and a catalyst and then adding the first polythiol compound (D1) including the dithiol compound (d1) having two mercapto groups and the polythiol compound (d2) having equal to or more than three mercapto groups and mixing the above. Here, the first amine compound (A1) is at least one kind selected from polyetheramines and aromatic amines.

The amine compound (A1), the diol compound (B1), the polyisocyanate compound (C), and the polythiol compound (D1) used for manufacturing the polymerizable composition of the present embodiment are as described above.

In the manufacturing of the polymerizable composition of the present embodiment, a mixture of the amine compound (A1) and the diol compound (B1) manufactured in the first step is provided for a reaction with the polyisocyanate compound (C) in the second step. By adopting this step, a prepolymer solution in which the prepolymer is uniformly dissolved is obtained without the prepolymer generated by the reaction described above being precipitated in the reaction solution. Due to this, the thiourethane urea resin obtained by the subsequent reaction with the polythiol compound (D1) has the desired optical characteristics.

By using the polyetheramine described above as the amine compound (A1), in the second step of the present embodiment, no prepolymer is precipitated, and the obtained thiourethane urea resin has excellent impact resistance.

The first amine compound (A1) and the second amine compound (A2) described below may be the same as or different from each other and are preferably different amine compounds.

In a case where an amine compound having a weight-average molecular weight of less than 400 is used, it is preferable to add the amine compound as the first amine compound (A1) in the first step in order to obtain a uniform prepolymer. The amine compound having a weight-average molecular weight of equal to or more than 400 and less than 4,000 may be added as the first amine compound (A1) in the first step or may be added as the second amine compound (A2) in the third step.

The diol compound (B1) used for manufacturing the polymerizable composition for an optical material of the present embodiment has a viscosity (25° C.) of equal to or less than 100 mPa·s and preferably a viscosity (25° C.) of equal to or more than 1 mPa·s and equal to or less than 100 mPa·s. The diol compound (B1) preferably has a molecular weight in a range of 50 to 350. By using such a diol compound (B1), the reaction between the amine compound (A1) and the polyisocyanate compound (C) in the second step proceeds gently and it is possible to generate a uniform prepolymer solution.

In the third step of the method for manufacturing a polymerizable composition for an optical material of the present embodiment, a catalyst may be used. Examples of the catalyst to be used include dimethyltin chloride, dibutyltin chloride, dibutyltin dilaurate, and the like, without being limited thereto.

In one embodiment, the third step may further include a step of adding the second diol (B2). In other words, in the third step, it is possible to include a step in which the prepolymer obtained in the second step and the catalyst are mixed, then the polythiol compound (D1) is added thereto, and then the second diol compound (B2) is added thereto and mixing is carried out.

The second diol compound (B2) may be the same as or different from the first diol (B1) as described above.

By using the second diol (B2) described above, the obtained thiourethane urea resin has low haze and excellent heat resistance.

In one embodiment, the third step may include a step in which the prepolymer obtained in the second step is mixed with a catalyst, then the second amine compound (A2) and the polythiol compound (D1) are added thereto and mixing is carried out. Here, the second amine compound (A2) preferably has a weight-average molecular weight of equal to or more than 400 and less than 4,000. The second amine compound (A2) may be the same as or different from the first amine compound (A1), but is preferably a different amine compound. The second amine compound (A2) is added to the prepolymer at the same time as or separately to the polythiol compound (D1), but the second amine compound (A2) is preferably added to the prepolymer before the addition of the polythiol compound (D1). Using the second amine compound (A2) makes it possible to adjust the viscosity (25° C.) and pot life of the obtained polymerizable composition. In addition, using the second amine compound (A2) makes it possible to adjust various physical properties such as optical properties, impact resistance, and specific gravity of the thiourethane urea resin obtained by curing the polymerizable composition according to the intended use.

In one embodiment, the third step may include a step in which the prepolymer obtained in the second step and a catalyst are mixed and then the second amine compound (A2), the polythiol compound (D1), and the second diol compound (B2) are added thereto and mixing is carried out. The addition of the second amine compound (A2), the polythiol compound (D1), and the second diol compound (B2) may be simultaneous or separate; however, the second amine compound (A2) is preferably added to the prepolymer first, then the polythiol compound (D1) and the second diol compound (B2) are preferably added. Using the second amine compound (A2) and the second diol compound (B2) in this manner makes it possible to adjust the viscosity (25° C.) and the pot life of the obtained polymerizable composition. In addition, using the above makes it possible to adjust various characteristics such as the optical properties, impact resistance, and specific gravity of the thiourethane urea resin obtained by curing the polymerizable composition according to the intended use.

<Application>

It is possible to use the polymerizable composition of the present embodiment to manufacture an optical article. Specifically, it is possible to manufacture an optical article by the step of obtaining a polymerizable composition for an optical material by the method described above and the step of polymerizing and curing the obtained polymerizable composition for an optical material by a cast polymerization method to obtain an optical article. Here, examples of optical articles include various plastic lenses such as plastic spectacle lenses, goggles, spectacle lenses for vision correction, lenses for imaging devices, fresnel lenses for liquid crystal projectors, lenticular lenses, and contact lenses, sealing materials for light emitting diodes (LEDs), optical waveguides, optical adhesives used for bonding optical lenses and optical waveguides, anti-reflection films used for optical lenses and the like, transparent coatings used for liquid crystal display device members (substrates, light guide plates, films, sheets, and the like), sheets or films to be attached to a windshield of a car or a helmet of a motorcycle, transparent substrates, and the like.

In the present embodiment, for example, the method for manufacturing an optical article includes, for example, the following steps.

Step a1: The polymerizable composition for an optical material of the present embodiment is cast in a mold.

Step b1: The polymerizable composition for an optical material is heated and the composition is polymerized and cured to obtain a cured product (a thiourethane urea resin molded product).

In step a1, first, the polymerizable composition is injected into a mold held by a gasket, a tape, or the like. At this time, depending on the physical properties required of the optical article to be obtained, it is preferable in many cases to perform a defoaming treatment under reduced pressure or a filtration treatment such as pressure filtration or reduced pressure filtration, as necessary.

In step b1, cast polymerization is performed. Since the conditions vary greatly depending on the composition of the polymerizable composition, the type and amount of the catalyst used, the shape of the mold, and the like, the mold is not limited; however, the cast polymerization is performed for approximately over 1 to 50 hours at −50 to 150° C. In some cases, it is preferable to hold the temperature in a range of 10 to 150° C. or to gradually raise the temperature and to carry out curing for 1 to 25 hours.

The optical article formed of the thiourethane urea resin of the present embodiment may be subjected to a treatment such as annealing, as necessary. The treatment is usually performed at a temperature of between 50 and 150° C., preferably at 90 to 140° C., and more preferably at 100 to 130° C.

It is possible to use the optical article obtained by the method of the present embodiment, for example, as a lens base material for a spectacle lens. The lens base material may be provided with a coating layer on one surface or both surfaces as necessary. Examples of the coating layer include a hard coat layer, an anti-reflection layer, an anti-fogging coat film layer, an anti-fouling layer, a water repellent layer, a primer layer, a photochromic layer, and the like. It is also possible to use each of these coating layers alone or to use a plurality of coating layers as a multilayer. In a case where a coating layer is applied to both surfaces, the same coating layer may be applied to each surface or different coating layers may be applied thereto.

In a case where the optical article of the present embodiment is applied to a lens base material for a spectacle lenses, a hard coat layer and/or an anti-reflection coating layer is formed on at least one surface of the optical article (lens base material) obtained by curing the polymerizable composition of the present embodiment.

It is also possible to use the optical article of the present embodiment as a lens base material of a plastic polarizing lens. The plastic polarizing lens is manufactured by a method in which a lens base material manufactured in advance is bonded to both surfaces of a polarizing film or a method in which a polymerizable composition is cast polymerized on both surfaces of a polarizing film. A description will be given below of a method for manufacturing a plastic polarizing lens by cast polymerization.

A method for manufacturing a plastic polarizing lens by cast polymerization includes the following steps.

Step a2: A polarizing film is fixed in a lens casting mold with at least one surface of the polarizing film separated from the mold.

Step b2: The polymerizable composition of the present embodiment is injected into a gap between the polarizing film and the mold.

Step c2: The polymerizable composition is heated, the composition is polymerized and cured, and a base material layer formed of a cured product of the polymerizable composition of the present embodiment is laminated on at least one surface of the polarizing film.

In step a2, a polarizing film formed of thermoplastic polyester or the like is placed in the space of the lens casting mold such that at least one of the film surfaces is parallel to the opposite mold inner surface. A gap portion is formed between the polarizing film and the mold. The polarizing film may be shaped in advance.

In the following step b2, the polymerizable composition for an optical material of the present embodiment is injected into a gap portion between the mold and the polarizing film in the space of the lens casting mold by a predetermined injection unit.

In the following step c2, the lens casting mold, to which the polarizing film into which the polymerizable composition for an optical material was injected is fixed, is cured and molded by heating for several hours to several tens of hours at a predetermined temperature program in an oven or in a heatable apparatus using water or the like.

Since the conditions vary depending on the composition of the polymerizable composition, the type of the catalyst, the shape of the mold, and the like, it is not possible to limit the temperature for the polymerization and curing; however, the above are performed at a temperature of 0 to 140° C. for 1 to 48 hours.

After completion of the curing and molding, it is possible to obtain a plastic polarizing lens in which a layer made of a cured product of the polymerizable composition of the present embodiment is laminated on at least one surface of the polarizing film, by taking the result out from the lens casting mold.

As described above, a description was given of the present invention using embodiments; however, the present invention is not limited to the embodiments described above and is able to take various forms without impairing the effects of the present invention.

EXAMPLES

A description will be given below of the present invention in more detail with reference to Examples, but the present invention is not limited thereto.

First, a description will be given below of a method for evaluating resins obtained in Examples of the present invention.

<Evaluation Method>

Transparency: An obtained resin was irradiated with light in a dark place using a projector and the presence or absence of cloudiness (including elution from the tape) and opaque substances was visually determined.

A case in which cloudiness (including elution from the tape) and opaque substances were not confirmed was set as "B" (transparency) and a case where the above were confirmed was set as "C" (no transparency).

Haze: The haze value of a 2.5 mm thick flat plate resin was measured using a haze meter (model number: NDH 2000) manufactured by Nippon Denshoku Industries Co., Ltd.

Distortion (striae): A case where projection was carried out through the obtained lens with a high-pressure UV lamp and no distortion was seen in the lens was set as "A" (no striae), a case where distortion was not seen in the lens by visual observation was set as "B", and a case where distortion was seen in the lens by visual observation was set as "C" (striae).

Refractive index (ne) and Abbe number (ve): Measuring was carried out at 20° C. using a Pulfrich refractometer.

Heat resistance: The glass transition temperature Tg was measured by the TMA penetration method (50 g load, pin tip 0.5 mmϕ, heating rate 10° C./min).

Specific gravity: Measuring was carried out by Archimedes' method.

Impact resistance: Steel balls were dropped in order from lighter steel balls to heavier steel balls from a height of 127 cm onto a lens with a center thickness of 1 mm according to the U.S. FDA until the lens broke to evaluate the impact resistance based on the weight of the steel ball which broke the lens. Steel balls were dropped in the order of 8 g→16 g→28 g→33 g →45 g→67 g→95 g→112 g→174 g→225 g→530 g. In addition, a description of ">530 g" in the table indicates that the lens did not break even when a 530 g steel ball was dropped thereon.

Light resistance: A QUV test (light source: UVA-340, intensity: 0.50 W/m$^2$, test condition: 50° C.×200 hours) was carried out using a 2 mm thick flat plate with an accelerated light resistance tester manufactured by Q-Lab and the hue change before and after irradiation was measured.

Solvent resistance: A non-woven fabric impregnated with acetone was pressed against the surface of the obtained lens for 10 seconds and a case where no trace of swelling was confirmed on the lens surface was set as "B" (solvent resistance) and a case where traces of swelling were confirmed was set as "C" (no solvent resistance).

Example 1

(First Step)

7.00 parts by weight of A1-1 and 5.00 parts by weight of B1-1 were mixed and dissolved in a 20 ml glass beaker at 25° C. for 30 minutes. The viscosity (25° C.) of the first mixture obtained by the mixing and dissolving was 32 mPa·s.

(Second Step)

The first mixture obtained in the first step was added dropwise to and reacted with 57.90 parts by weight of C-1 at 25° C. over 1 hour to obtain a prepolymer.

(Third Step)

0.10 parts by weight of dibutyltin dichloride as a catalyst and 0.30 parts by weight of an internal mold release agent (manufactured by Mitsui Chemicals, Inc., product name, internal mold release agent for MR) were mixed and dissolved in the prepolymer obtained in the second step to obtain a uniform solution. 14.55 parts by weight of d-1 and 15.55 parts by weight of d2-1 were added to the obtained uniform solution and mixed and dissolved at 25° C. for 10 minutes to obtain a second mixture.

Manufacturing of Molded Product

The second mixture obtained in the third step was defoamed under a condition of a reduced pressure of 400 Pa and then injected into a glass mold. The result was put into a polymerization oven and the temperature was gradually raised from 25° C. to 120° C. over 24 hours to carry out polymerization. After the polymerization was completed, the result was taken out of the oven and a mold release operation was performed. The obtained molded product was further subjected to an annealing treatment at 120° C. for 1 hour. Table 1 shows the evaluation results of the obtained molded products.

Examples 2 to 6, 22 to 25

Molded products were obtained in the same manner as in Example 1, except that the type and blending amounts of the compounds used were changed as shown in Table 1. Table 1 shows the evaluation results of the molded products.

Example 7

A uniform solution was obtained in the third step by the same method as in Example 1, except that the type and blending amount of the compound used were changed as shown in Table 1 and 10.10 parts by weight of C-2, 15.25 parts by weight of d-1, and 16.25 parts by weight of d2-1 were added thereto and mixed and dissolved at 25° C. for 10 minutes to obtain a second mixture. Subsequently, a molded product was manufactured by the same method as in Example 1, except that the parts by weight of each compound were changed as shown in Table 1. Table 1 shows the evaluation results of the obtained molded products.

Example 8

A uniform solution was obtained in the third step by the same method as in Example 1, except that the type and blending amount of the compound used were changed as shown in Table 1 and 6.00 parts by weight of A2-1, 16.81 parts by weight of d-1, and 17.97 parts by weight of d2-1 were added thereto and mixed and dissolved at 25° C. for 10 minutes to obtain a second mixture. Subsequently, a molded product was manufactured by the same method as in Example 6, except that the blending amounts of each compound were changed as shown in Table 1. Table 1 shows the evaluation results of the obtained molded products.

Examples 9 to 12

Molded products were obtained by the same method as in Example 8, except that the types and blending amounts of the compounds used were changed as shown in Table 1. Table 1 shows the evaluation results of the obtained molded products.

Example 13

A uniform solution was obtained in the third step by the same method as in Example 1, except that the type and blending amount of the compound used were changed as shown in Table 1 and 7.50 parts by weight of B2-1, 20.60 parts by weight of d-1, and 9.45 parts by weight of d2-1 were added thereto and mixed and dissolved at 25° C. for 10 minutes to obtain a second mixture. Subsequently, a molded product was manufactured by the same method as in Example 1, except that the blending amounts of each compound were changed as shown in Table 1. Table 1 shows the evaluation results of the obtained molded products.

Examples 14 to 18, 21, 26 to 31

Molded products were obtained by the same method as in Example 13, except that the types and blending amounts of the compounds used were changed as shown in Table 1. Table 1 shows the evaluation results of the obtained molded products.

Example 19

A uniform solution was obtained in the third step by the same method as in Example 1, except that the type and blending amount of the compound used were changed as shown in Table 1 and 2.5 parts by weight of A2-1, 5.00 parts by weight of B2-1, 21.63 parts by weight of d-1, and 9.91 parts by weight of d2-1 were added thereto and mixed and dissolved at 25° C. for 10 minutes to obtain a second mixture. Subsequently, a molded product was manufactured by the same method as in Example 1, except that the blending amounts of each compound were changed as shown in Table 1. Table 1 shows the evaluation results of the obtained molded products.

Example 20

The process was carried out by the same method as in Example 19, except that the parts by weight of the compound used were changed as shown in Table 1. The results are as shown in Table 1.

Comparative Example 1

Using the same method as in Example 1, except that the type and blending amount of the compound used were changed as shown in Table 1, 0.10 parts by weight of dibutyltin dichloride as a catalyst and 0.30 parts by weight of an internal mold release agent (manufactured by Mitsui Chemicals; product name: internal mold release agent for MR) were added to the prepolymer obtained in the second step and mixed and dissolved to form a uniform solution. 36.55 parts by weight of d-1 only was added to the obtained uniform solution and mixed and dissolved at 25° C. for 10 minutes to obtain a second mixture. The second mixture obtained in the third step was defoamed under reduced pressure conditions of 400 Pa and then injected into a glass mold. The result was put into a polymerization oven and the temperature was gradually raised from 25° C. to 120° C. over 24 hours to carry out polymerization. After the polymerization was completed, the result was taken out of the oven and a mold release operation was performed to obtain a molded product from the mold; however, a large number of air bubbles were generated and mixed in the obtained molded product and it was not possible to acquire physical property data therefrom.

Comparative Examples 2 and 3

Without using the diol compound (B-1), the amine compound (A1) was added dropwise to and reacted with the polyisocyanate compound (C-1) to attempt to synthesize a prepolymer in the second step, but the polymer was precipitated at the same time as the dropwise addition of the amine compound (A1) and the preparation was stopped without obtaining a uniform prepolymer.

Comparative Examples 4 to 9, 13

The synthesis of the prepolymer in the second step was attempted by the same method as in Example 1, except that the type and blending amount of the compound used were changed as shown in Table 1, but the polymer was precipitated at the same time as the dropwise addition of the first mixture obtained in the first step and the preparation was stopped without obtaining a uniform prepolymer.

Comparative Example 10

A molded product was manufactured by the same method as in Example 1, except that the blending amount of the compound used was changed as shown in Table 1. Table 1 shows the evaluation results of the obtained molded products. In the results, the molded product of Comparative Example 10 was inferior in impact resistance to Example 1.

Comparative Examples 11 and 12

Molded products were manufactured by the same method as in Example 1, except that the parts by weight of the compounds used were changed as shown in Table 1. However, a large number of air bubbles were generated and mixed in the obtained molded products and it was not possible to acquire physical property data.

Reference Examples 1 to 3

The synthesis of the prepolymer in the second step was attempted by the same method as in Example 1, except that the types and blending amounts of the compounds used were changed as shown in Table 1, but the polymers were precipitated at the same time as the dropwise addition of the first mixture obtained in the first step and the preparation was stopped without obtaining uniform prepolymers.

TABLE 1

| | | Manufacturing Method | | | | | | | Physical properties of second mixture |
|---|---|---|---|---|---|---|---|---|---|
| | | Obtain second mixture by mixing B compound and D compound with prepolymer | | | | | | | |
| | | Obtain prepolymer | | | | | | | |
| | | First step | | Second step | Third step | | | | |
| Component | | Amine 1 (pbw) | Diol 1 (pbw) | Isocyanate 1 (pbw) | Isocyanate 2 (pbw) | Amine 2 (pbw) | Diol 2 (pbw) | Thiol 1 (pbw) | Thiol 2 (pbw) | Viscosity of Diol 1 [mPa · s] |
| Example | 1 | A1-1 (7.00) | B1-1 (5.00) | C-1 (57.90) | — | — | — | d-1 (14.55) | d2-1 (15.55) | 49 |
| | 2 | A1-1 (7.00) | B1-1 (3.00) | C-1 (56.60) | — | — | — | d-1 (16.15) | d2-1 (17.25) | 49 |

TABLE 1-continued

| | | | | | | | | | | |
|---|---|---|---|---|---|---|---|---|---|---|
| | 3 | A1-1 (7.00) | B1-2 (5.00) | C-1 (55.30) | — | — | — | d-1 (16.90) | d2-1 (15.80) | 75 |
| | 4 | A1-1 (7.00) | B1-2 (3.00) | C-1 (55.05) | — | — | — | d-1 (16.90) | d2-1 (18.05) | 75 |
| | 5 | A1-1 (7.00) | B1-3 (7.00) | C-1 (54.05) | — | — | — | d-1 (15.45) | d2-1 (16.50) | 52 |
| | 6 | A1-1 (7.00) | B1-3 (7.00) | C-1 (53.55) | — | — | — | d-1 (15.45) | d2-2 (17.00) | 52 |
| | 7 | A1-1 (7.00) | B1-2 (7.00) | C-1 (44.40) | C-2 (10.10) | — | — | d-1 (15.25) | d2-1 (16.25) | 75 |
| | 8 | A1-1 (3.00) | B1-2 (3.00) | C-1 (53.22) | — | A2-1 (6.00) | — | d-1 (16.81) | d2-1 (17.97) | 75 |
| | 9 | A1-1 (4.02) | B1-2 (1.72) | C-1 (54.52) | — | A2-1 (5.74) | — | d-1 (22.95) | d2-1 (11.05) | 75 |
| | 10 | A1-1 (2.00) | B1-2 (2.00) | C-1 (52.39) | — | A2-1 (8.00) | — | d-1 (17.21) | d2-1 (18.40) | 75 |
| | 11 | A1-1 (3.50) | B1-3 (7.00) | C-1 (53.05) | — | A2-1 (3.50) | — | d-1 (15.95) | d2-1 (17.00) | 52 |
| | 12 | A1-1 (3.50) | B1-3 (7.00) | C-1 (52.45) | — | A2-1 (3.50) | — | d-1 (15.95) | d2-2 (17.60) | 52 |
| | 13 | A1-1 (3.00) | B1-1 (1.50) | C-1 (57.95) | — | — | B2-1 (7.50) | d-1 (20.60) | d2-1 (9.45) | 49 |
| | 14 | A1-1 (3.00) | B1-1 (3.00) | C-1 (58.89) | — | — | B2-1 (7.50) | d-1 (18.94) | d2-1 (8.67) | 49 |
| | 15 | A1-1 (3.00) | B1-1 (1.50) | C-1 (56.65) | — | — | B2-2 (7.50) | d-1 (21.50) | d2-1 (9.85) | 49 |
| | 16 | A1-1 (3.00) | B1-1 (3.00) | C-1 (56.25) | — | — | B2-2 (7.50) | d-1 (21.17) | d2-1 (9.08) | 49 |
| | 17 | A1-1 (3.00) | B1-2 (3.00) | C-1 (57.30) | — | — | B2-1 (7.50) | d-1 (20.00) | d2-1 (9.20) | 75 |
| | 18 | A1-1 (3.00) | B1-2 (3.00) | C-1 (56.06) | — | — | B2-2 (7.50) | d-1 (20.88) | d2-1 (9.56) | 75 |
| | 19 | A1-1 (2.50) | B1-2 (2.50) | C-1 (55.96) | — | A2-1 (2.50) | B2-1 (5.00) | d-1 (21.63) | d2-1 (9.91) | 75 |
| | 20 | A1-1 (2.50) | B1-2 (2.50) | C-1 (55.12) | — | A2-1 (2.50) | B2-2 (5.00) | d-1 (22.21) | d2-1 (10.17) | 75 |
| | 21 | A1-1 (2.50) | B1-2 (2.50) | C-1 (52.90) | — | — | B2-3 (7.50) | d-1 (23.75) | d2-1 (10.85) | 75 |
| | 22 | A2-1 (7.00) | B1-1 (7.00) | C-1 (57.93) | — | — | — | d-1 (13.57) | d2-1 (14.50) | 49 |
| | 23 | A2-1 (7.00) | B1-2 (7.00) | C-1 (54.20) | — | — | — | d-1 (15.35) | d2-1 (16.45) | 75 |
| | 24 | A1-2 (2.50) | B1-2 (2.50) | C-1 (57.69) | — | — | — | d-1 (25.58) | d2-1 (11.73) | 75 |
| | 25 | A1-2 (2.50) | B1-2 (2.50) | C-1 (58.19) | — | — | — | d-1 (32.90) | d2-1 (3.91) | 75 |
| | 26 | A1-2 (2.50) | B1-2 (2.50) | C-1 (54.27) | — | — | B2-4 (7.50) | d-1 (29.70) | d2-1 (3.53) | 75 |
| | 27 | A1-2 (2.50) | B1-2 (2.50) | C-1 (55.04) | — | — | B2-5 (7.50) | d-1 (29.01) | d2-1 (3.45) | 75 |
| | 28 | A1-2 (2.50) | B1-2 (2.50) | C-1 (54.40) | — | — | B2-6 (7.50) | d-1 (29.59) | d2-1 (3.51) | 75 |
| | 29 | A1-2 (2.50) | B1-5 (2.50) | C-1 (55.27) | — | — | B2-7 (7.50) | d-1 (28.81) | d2-1 (3.42) | 36 |
| | 30 | A1-2 (2.50) | B1-4 (2.50) | C-1 (56.21) | — | — | B2-7 (7.50) | d-1 (27.82) | d2-1 (3.47) | 20 |
| | 31 | A1-2 (2.50) | B1-6 (2.50) | C-1 (54.11) | — | — | B2-7 (7.50) | d-1 (29.68) | d2-1 (3.71) | 48 |
| Comparative Example | 1 | A1-2 (2.50) | B1-2 (2.50) | C-1 (58.45) | — | — | — | d-1 (36.55) | — | 75 |
| | 2 | A1-1 (7.00) | — | C-1 (53.49) | — | | | | | — |
| | 3 | A1-2 (2.50) | — | C-1 (55.66) | — | | | | | — |
| | 4 | A1-1 (7.00) | B1-7 (7.00) | C-1 (52.30) | — | — | — | — | — | 100 |
| | 5 | A1-1 (7.00) | B1-7 (7.00) | C-1 (51.75) | — | — | — | — | — | 100 |
| | 6 | A1-1 (7.00) | B2-1 (7.00) | C-1 (55.15) | — | — | — | — | — | 20,000 |
| | 7 | A1-1 (7.00) | B2-1 (7.00) | C-1 (54.70) | — | — | — | — | — | 20,000 |
| | 8 | A1-1 (7.00) | B2-2 (7.00) | C-1 (53.95) | — | — | — | — | — | 25,000 |
| | 9 | A1-1 (7.00) | B2-2 (7.00) | C-1 (53.45) | — | — | — | — | — | 25,000 |
| | 10 | A1-2 (2.50) | B1-2 (2.50) | C-1 (55.90) | — | — | — | — | d2-1 (39.10) | 75 |
| | 11 | A1-4 (7.00) | B1-1 (7.00) | C-1 (56.47) | — | — | — | d-1 (13.90) | d2-1 (15.63) | 49 |

TABLE 1-continued

|  |  |  |  |  |  |  |  |  |  |  |
|---|---|---|---|---|---|---|---|---|---|---|
|  | 12 | A1-4 (7.00) | B1-2 (7.00) | C-1 (52.83) | — | — | — | d-1 (15.62) | d2-1 (17.55) | 75 |
|  | 13 | A1-6 (7.00) | B1-1 (7.00) | C-1 (62.41) | — | — | — | — | — | 49 |
| Reference Examples | 1 | A1-3 (5.00) | B1-1 (5.00) | C-1 (58.22) | — | — | — | — | — | 49 |
|  | 2 | A1-3 (5.00) | B1-2 (5.00) | C-1 (55.62) | — | — | — | — | — | 75 |
|  | 3 | A1-5 (7.00) | B1-1 (7.00) | C-1 (61.57) | — | — | — | — | — | 49 |

| | | Manufacturing Method | | | | | |
|---|---|---|---|---|---|---|---|
| | | Physical properties of second mixture | Physical properties of obtained molded product | | | | |
| | | | Optical properties | | | | |
| Component | | Viscosity of mixed solution of amine 1 and diol 1 | Transparency | HAZE | Striae | Refractive index [ne] | Abbe number [ve] | Heat resistance [° C.] |
|---|---|---|---|---|---|---|---|---|
| Example | 1 | 32 | B | 0.32 | A | 1.583 | 41 | 99 |
|  | 2 | 31 | B | 0.32 | A | 1.590 | 41 | 103 |
|  | 3 | 43 | B | 0.32 | A | 1.587 | 41 | 97 |
|  | 4 | 36 | B | 0.32 | A | 1.593 | 41 | 98 |
|  | 5 | 36 | B | 0.32 | A | 1.584 | 41 | 93 |
|  | 6 | 36 | B | 0.32 | A | 1.586 | 41 | 96 |
|  | 7 | 47 | B | 0.35 | A | 1.581 | 41 | 84 |
|  | 8 | 47 | B | 0.35 | A | 1.591 | 41 | 91 |
|  | 9 | 36 | B | 0.35 | A | 1.590 | 41 | 88 |
|  | 10 | 47 | B | 0.35 | A | 1.592 | 41 | 92 |
|  | 11 | 42 | B | 0.35 | A | 1.586 | 41 | 90 |
|  | 12 | 42 | B | 0.35 | A | 1.588 | 41 | 94 |
|  | 13 | 33 | B | 0.32 | A | 1.585 | 42 | 100 |
|  | 14 | 29 | B | 0.32 | A | 1.579 | 42 | 101 |
|  | 15 | 32 | B | 0.32 | A | 1.589 | 42 | 101 |
|  | 16 | 29 | B | 0.32 | A | 1.585 | 42 | 95 |
|  | 17 | 47 | B | 0.32 | A | 1.582 | 42 | 99 |
|  | 18 | 47 | B | 0.32 | A | 1.586 | 42 | 100 |
|  | 19 | 47 | B | 0.35 | A | 1.586 | 41 | 90 |
|  | 20 | 47 | B | 0.35 | A | 1.589 | 41 | 92 |
|  | 21 | 47 | B | 0.32 | A | 1.589 | 41 | 88 |
|  | 22 | 51 | B | 0.36 | A | 1.589 | 41 | 95 |
|  | 23 | 63 | B | 0.36 | A | 1.589 | 41 | 90 |
|  | 24 | 39 | B | 0.32 | A | 1.604 | 39 | 100 |
|  | 25 | 39 | B | 0.32 | A | 1.602 | 39 | 95 |
|  | 26 | 39 | B | 0.32 | A | 1.592 | 40 | 82 |
|  | 27 | 39 | B | 0.32 | A | 1.591 | 40 | 84 |
|  | 28 | 39 | B | 0.35 | A | 1.592 | 40 | 86 |
|  | 29 | 20 | B | 0.35 | A | 1.596 | 39 | 89 |
|  | 30 | 19 | B | 0.32 | A | 1.594 | 40 | 91 |
|  | 31 | 26 | B | 0.32 | A | 1.596 | 39 | 88 |
| Comparative Example | 1 | 39 | C | 0.89 | C | *. Since bubbles were mixed into the obtained resin, it was not possible to acquire physical property data | | |
|  | 2 | 20 | *. C-1/A1-1 During synthesis of prepolymer, the polymer was precipitated, thus, preparation was stopped | | | | | |
|  | 3 | 8 | *. C-1/A1-2 During synthesis of prepolymer, the polymer was precipitated, thus, preparation was stopped | | | | | |
|  | 4 | 60 | *. C-1/(A1-1 + B1-7) During synthesis of prepolymer, the polymer was precipitated, thus, preparation was stopped | | | | | |
|  | 5 | 60 | *. C-1/(A1-1 + B1-7) During synthesis of prepolymer, the polymer was precipitated, thus, preparation was stopped | | | | | |
|  | 6 | 9,500 | *. C-1/(A1-1 + B2-1) During synthesis of prepolymer, the polymer was precipitated, thus, preparation was stopped | | | | | |
|  | 7 | 9,500 | *. C-1/(A1-1 + B2-1) During synthesis of prepolymer, the polymer was precipitated, thus, preparation was stopped | | | | | |
|  | 8 | 15,000 | *. C-1/(A1-1 + B2-2) During synthesis of prepolymer, the polymer was precipitated, thus, preparation was stopped | | | | | |
|  | 9 | 15,000 | *. C-1/(A1-1 + B2-2) During synthesis of prepolymer, the polymer was precipitated, thus, preparation was stopped | | | | | |
|  | 10 | 39 | B | 0.32 | A | 1.608 | 39 | 118 |
|  | 11 | 630 | *. The obtained resin was extremely Cloudy, thus, further characteristic evaluation was stopped. | | | | | |
|  | 12 | 630 | *. The obtained resin was extremely Cloudy, thus, further characteristic evaluation was stopped. | | | | | |
|  | 13 | 25 | *. C-1/(A1-6 + B1-1) During synthesis of prepolymer, the polymer was precipitated, thus, preparation was stopped | | | | | |

TABLE 1-continued

| | | | |
|---|---|---|---|
| Reference Examples | 1 | 40 | *. C-1/(A1-3 + B1-1) During synthesis of prepolymer, the polymer was precipitated, thus, preparation was stopped |
| | 2 | 45 | *. C-1/(A1-3 + B1-1) During synthesis of prepolymer, the polymer was precipitated, thus, preparation was stopped |
| | 3 | 25 | *. C-1/(A1-5 + B1-1) During synthesis of prepolymer, the polymer was precipitated, thus, preparation was stopped |

| Component | | | Manufacturing Method / Physical properties of obtained molded product | | | |
|---|---|---|---|---|---|---|
| | | | Resin specific gravity [20° C.] | Impact resistance | Light resistance [QUV ΔYI] | Solvent resistance [acetone] |
| Example | | 1 | 1.260 | >530 g | 1.2 | B |
| | | 2 | 1.263 | >530 g | 1.2 | B |
| | | 3 | 1.259 | >530 g | 1.2 | B |
| | | 4 | 1.256 | >530 g | 1.2 | B |
| | | 5 | 1.254 | >530 g | 1.2 | B |
| | | 6 | 1.251 | >530 g | 1.2 | B |
| | | 7 | 1.247 | >530 g | 1.2 | B |
| | | 8 | 1.260 | >530 g | 1.2 | B |
| | | 9 | 1.259 | >530 g | 1.2 | B |
| | | 10 | 1.260 | >530 g | 1.2 | B |
| | | 11 | 1.254 | >530 g | 1.2 | B |
| | | 12 | 1.257 | >530 g | 1.2 | B |
| | | 13 | 1.252 | >530 g | 1.2 | B |
| | | 14 | 1.249 | >530 g | 1.2 | B |
| | | 15 | 1.262 | >530 g | 1.2 | B |
| | | 16 | 1.28 | >530 g | 1.2 | B |
| | | 17 | 1.250 | >530 g | 1.2 | B |
| | | 18 | 1.257 | >530 g | 1.2 | B |
| | | 19 | 1.254 | >530 g | 1.2 | B |
| | | 20 | 1.259 | >530 g | 1.2 | B |
| | | 21 | 1.257 | >530 g | 1.2 | B |
| | | 22 | 1.257 | >530 g | 1.2 | B |
| | | 23 | 1.257 | >530 g | 1.2 | B |
| | | 24 | 1.276 | >530 g | 3.2 | B |
| | | 25 | 1.274 | >530 g | 3.2 | B |
| | | 26 | 1.262 | >530 g | 3.2 | B |
| | | 27 | 1.262 | >530 g | 3.2 | B |
| | | 28 | 1.262 | >530 g | 3.2 | B |
| | | 29 | 1.265 | >530 g | 3.2 | B |
| | | 30 | 1.263 | >530 g | 3.2 | B |
| | | 31 | 1.265 | >530 g | 3.2 | B |
| Comparative Example | | 1 | *. Since bubbles were mixed into the obtained resin, it was not possible to acquire physical property data | | | C |
| | | 2 | *. C-1/A1-1 During synthesis of prepolymer, the polymer was precipitated, thus, preparation was stopped | | | |
| | | 3 | *. C-1/A1-2 During synthesis of prepolymer, the polymer was precipitated, thus, preparation was stopped | | | |
| | | 4 | *. C-1/(A1-1 + B1-7) During synthesis of prepolymer, the polymer was precipitated, thus, preparation was stopped | | | |
| | | 5 | *. C-1/(A1-1 + B1-7) During synthesis of prepolymer, the polymer was precipitated, thus, preparation was stopped | | | |
| | | 6 | *. C-1/(A1-1 + B2-1) During synthesis of prepolymer, the polymer was precipitated, thus, preparation was stopped | | | |
| | | 7 | *. C-1/(A1-1 + B2-1) During synthesis of prepolymer, the polymer was precipitated, thus, preparation was stopped | | | |
| | | 8 | *. C-1/(A1-1 + B2-2) During synthesis of prepolymer, the polymer was precipitated, thus, preparation was stopped | | | |
| | | 9 | *. C-1/(A1-1 + B2-2) During synthesis of prepolymer, the polymer was precipitated, thus, preparation was stopped | | | |
| | | 10 | 1.285 | 225 g | 3.2 | B |
| | | 11 | *. The obtained resin was extremely Cloudy, thus, further characteristic evaluation was stopped. | | | |
| | | 12 | *. The obtained resin was extremely Cloudy, thus, further characteristic evaluation was stopped. | | | |
| | | 13 | *. C-1/(A1-6 + B1-1) During synthesis of prepolymer, the polymer was precipitated, thus, preparation was stopped | | | |
| Reference Examples | | 1 | *. C-1/(A1-3 + B1-1) During synthesis of prepolymer, the polymer was precipitated, thus, preparation was stopped | | | |
| | | 2 | *. C-1/(A1-3 + B1-1) During synthesis of prepolymer, the polymer was precipitated, thus, preparation was stopped | | | |
| | | 3 | *. C-1/(A1-5 + B1-1) During synthesis of prepolymer, the polymer was precipitated, thus, preparation was stopped | | | |

The reference symbols in the table have the following meanings.

(Amine Compound (A1))

A1-1: (Propylene glycol) bis(2-aminopropyl ether) having a weight-average molecular weight of 400 (Jeffamine D-400 manufactured by Huntsman)

A1-2: Diethyltoluenediamine (Ethacure 100 manufactured by Albemarle Corporation)

A1-3: (Propylene glycol) bis(2-aminopropyl ether) having a weight-average molecular weight of 230 (Jeffamine D-230 manufactured by Huntsman)

A1-4: (Propylene glycol) bis(2-aminopropyl ether) having a weight-average molecular weight of 4,000 (Jeffamine D-4000 manufactured by Huntsman)

A1-5: m-xylylenediamine

A1-6: Hexamethylenediamine (Amine Compound (A2))

A2-1: (Propylene glycol) bis(2-aminopropyl ether) having a weight-average molecular weight of 2,000 (Jeffamine D-2000 manufactured by Huntsman)

(Diol Compound (B1))

B1-1: Propylene glycol

B1-2: Dipropylene glycol

B1-3: Tripropylene glycol

B1-4: Ethylene glycol

B1-5: Diethylene glycol

B1-6: Triethylene glycol

B1-7: Polypropylene glycol, diol type 400

B1-8: Tricyclodecanedimethanol (Diol Compound (B2))

B2-1: 1,4-cyclohexanedimethanol

B2-2: Tricyclodecanedimethanol

B2-3: Polyether polyol (weight-average molecular weight 2,000, manufactured by Mitsui Chemicals, Inc., Actcall ED-56)

B2-4: Polycaprolactonediol (weight-average molecular weight 500, manufactured by Daicel Corporation)

B2-5: Polycarbonate diol (weight-average molecular weight 500, manufactured by Ube Industries, Ltd.)

B2-6: Polycarbonate (weight-average molecular weight 1,000, diol manufactured by Ube Industries, Ltd.)

B2-7: Bisphenol A ethoxylate (number average molecular weight 492, Aldrich reagent EO/phenol, 3)

(Polyisocyanate Compound (C))

C-1: A mixture of 2,5-bis(isocyanatomethyl)-bicyclo[2.2.1]heptane and 2,6-bis(isocyanatomethyl)-bicyclo[2.2.1]heptane C-2: Hexamethylene diisocyanate (Polythiol Compound (D1)

d1: Bis(2-mercaptoethyl) sulfide d2-1: 4-mercaptomethyl-1,8-dimercapto-3,6-dithiaoctane d2-2: A mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane In the method of the Examples, a resin having an excellent balance between optical characteristics and mechanical characteristics was obtained without polymer precipitation during the synthesis of the prepolymer. On the other hand, in the method of the Comparative Examples, the polymer was precipitated during the synthesis of the prepolymer and it was not possible to prepare a resin.

This application claims priority based on Japanese Patent Application No. 2018-048936 filed on Mar. 16, 2018, the disclosure of which is incorporated herein in its entirety.

The invention claimed is:

1. A polymerizable composition for an optical material, comprising:
    a prepolymer which is a reaction product of
        a first amine compound (A1) having a weight-average molecular weight of less than 4,000,
        a first diol compound (B1) having a viscosity at 25° C. of equal to or less than 100 mPa·s, and
        a polyisocyanate compound (C);
    a polythiol ingredient (D1); and
    a catalyst,
    wherein the first amine compound (A1) is at least one selected from a polyetheramine and an aromatic amine,
    the polythiol ingredient (D1) includes a dithiol compound (d1) having two mercapto groups and a polythiol compound (d2) having equal to or more than three mercapto groups, and
    the prepolymer is formed prior to being combined with the polythiol ingredient (D1).

2. The polymerizable composition for an optical material according to claim 1,
    wherein the polyetheramine includes at least one selected from the group consisting of a polyetheramine represented by Formula (1) and a polyetheramine represented by Formula (2):

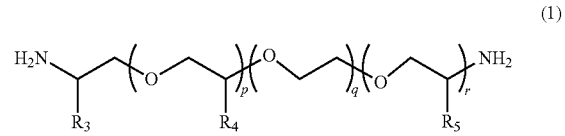

(1)

wherein in Formula (1), $R_3$ to $R_5$ each represent a hydrogen atom or a methyl group, p represents an integer of 0 to 49, q represents an integer of 0 to 65, r represents an integer of 1 to 50, p+r satisfies an integer of 1 to 99, and a plurality of $R_4$s or $R_5$s may be the same as or different from each other;

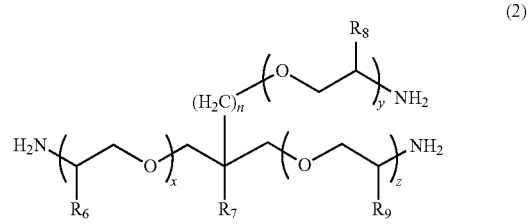

(2)

wherein in Formula (2), $R_6$, $R_8$, and $R_9$ each represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 50, n represents an integer of 0 to 10, and a plurality of $R_6$s, $R_8$s, or $R_9$s may be the same as or different from each other.

3. The polymerizable composition for an optical material according to claim 2,
    wherein the polyetheramine has a weight-average molecular weight of more than 230.

4. The polymerizable composition for an optical material according to claim 1,
    wherein the aromatic amine is at least one selected from the group consisting of 3,5-diethyltoluene-2,4-diamine and 3,5-diethyltoluene-2,6-diamine.

5. The polymerizable composition for an optical material according to claim 1, further comprising:
a second diol compound (B2).

6. The polymerizable composition for an optical material according to claim 1, further comprising:
a second amine compound (A2) having a weight-average molecular weight of equal to or more than 400 and less than 4,000.

7. The polymerizable composition for an optical material according to claim 1, further comprising:
a second amine compound (A2) having a weight-average molecular weight of equal to or more than 400 and less than 4,000 and a second diol compound (B2).

8. The polymerizable composition for an optical material according to claim 1,
wherein the first diol compound (B1) includes a linear aliphatic diol.

9. The polymerizable composition for an optical material according to claim 1,
wherein the first diol compound (B1) has a viscosity at 25° C. of equal to or more than 1 mPa·s and equal to or less than 100 mPa·s.

10. The polymerizable composition for an optical material according to claim 5,
wherein the second diol compound (B2) has a viscosity at 25° C. of equal to or more than 100 mPa·s.

11. The polymerizable composition for an optical material according to claim 1,
wherein the catalyst includes at least one selected from dimethyltin chloride, dibutyltin chloride, and dibutyltin dilaurate.

12. A method for manufacturing a polymerizable composition for an optical material, the method comprising:
a first step of mixing a first amine compound (A1) having a weight-average molecular weight of less than 4,000 with a first diol compound (B1) having a viscosity at 25° C. of equal to or less than 100 mPa·s to obtain a first mixture, the first amine compound (A1) being at least one selected from a polyetheramine and an aromatic amine;
a second step of obtaining a prepolymer by mixing the first mixture and a polyisocyanate compound (C), wherein the prepolymer is a reaction product of the first amine compound (A1), the first diol compound (B1), and the polyisocyanate compound (C); and
a third step of mixing the prepolymer and a catalyst, then adding a polythiol ingredient (D1) thereto, the polythiol ingredient (D1) including a dithiol compound (d1) having two mercapto groups and a polythiol compound (d2) having equal to or more than three mercapto groups, and carrying out mixing.

13. The method for manufacturing a polymerizable composition for an optical material according to claim 12,
wherein the polyetheramine includes at least one selected from the group consisting of a polyetheramine represented by Formula (1) and a polyetheramine represented by Formula (2):

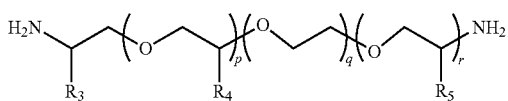

(1)

wherein in Formula (1), $R_3$ to $R_5$ each represent a hydrogen atom or a methyl group, p represents an integer of 0 to 49, q represents an integer of 0 to 65, r represents an integer of 1 to 50, p+r satisfies an integer of 1 to 99, and a plurality of $R_4$s or $R_5$s may be the same as or different from each other;

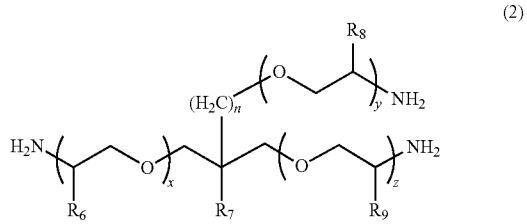

(2)

wherein in Formula (2), $R_6$, $R_8$, and $R_9$ each represent a hydrogen atom or a methyl group, $R_7$ represents a linear alkyl group having 1 to 20 carbon atoms, a branched alkyl group having 3 to 20 carbon atoms, or a cyclic alkyl group having 3 to 20 carbon atoms, x+y+z represents an integer of 1 to 50, n represents an integer of 0 to 10, and a plurality of $R_6$s, $R_8$s, or $R_9$s may be the same as or different from each other.

14. The method for manufacturing a polymerizable composition for an optical material according to claim 13,
wherein the polyetheramine has a weight-average molecular weight of more than 230.

15. The method for manufacturing a polymerizable composition for an optical material according to claim 12,
wherein the aromatic amine is at least one selected from the group consisting of 3,5-diethyltoluene-2,4-diamine and 3,5-diethyltoluene-2,6-diamine.

16. The method for manufacturing a polymerizable composition for an optical material according to claim 12,
wherein the third step includes a step of mixing the prepolymer and the catalyst, then adding the polythiol ingredient (D1) thereto and carrying out mixing, then adding a second diol compound (B2) thereto and carrying out mixing.

17. The method for manufacturing a polymerizable composition for an optical material according to claim 12,
wherein the third step includes a step of mixing the prepolymer and the catalyst, then adding a second amine compound (A2) having a weight-average molecular weight of equal to or more than 400 and less than 4,000 and the polythiol ingredient (D1) thereto and carrying out mixing.

18. The method for manufacturing a polymerizable composition for an optical material according to claim 12,
wherein the third step includes a step of mixing the prepolymer and the catalyst, then adding a second amine compound (A2), the polythiol ingredient (D1), and a second diol compound (B2) thereto and carrying out mixing.

19. The method for manufacturing a polymerizable composition for an optical material according to claim 12,
wherein the first diol compound (B1) includes a linear aliphatic diol.

20. The method for manufacturing a polymerizable composition for an optical material according to claim 12,
wherein the first diol compound (B1) has a viscosity at 25° C. of equal to or more than 1 mPa·s and equal to or less than 100 mPa·s.

21. The method for manufacturing a polymerizable composition for an optical material according to claim 16,
wherein the second diol compound (B2) has a viscosity at 25° C. of equal to or more than 100 mPa·s.

22. A method for manufacturing an optical article, the method comprising:
a step of polymerizing and curing the polymerizable composition for an optical material according to claim 1 by a cast polymerization method to obtain an optical article.

23. A method for manufacturing an optical article, the method comprising:
a step of obtaining a polymerizable composition for an optical material by the method according to claim 12; and
a step of obtaining an optical article by polymerizing and curing the polymerizable composition for an optical material by a cast polymerization method.

\* \* \* \* \*